(12) United States Patent
Zhao et al.

(10) Patent No.: US 11,190,390 B2
(45) Date of Patent: Nov. 30, 2021

(54) ALARM INFORMATION PROCESSING METHOD AND APPARATUS, SYSTEM, AND COMPUTER STORAGE MEDIUM

(71) Applicant: TENCENT TECHNOLOGY (SHENZHEN) COMPANY LIMITED, Guangdong (CN)

(72) Inventors: Ziqing Zhao, Guangdong (CN); Xin Nie, Guangdong (CN); Dingan Liang, Guangdong (CN); Bo Yang, Guangdong (CN); Haoyu Huang, Guangdong (CN); Lan Zhang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 514 days.

(21) Appl. No.: 15/774,032

(22) PCT Filed: Jan. 22, 2017

(86) PCT No.: PCT/CN2017/072112
§ 371 (c)(1),
(2) Date: May 7, 2018

(87) PCT Pub. No.: WO2017/133522
PCT Pub. Date: Aug. 10, 2017

(65) Prior Publication Data
US 2018/0324029 A1    Nov. 8, 2018

(30) Foreign Application Priority Data

Feb. 3, 2016 (CN) .................. 201610075817.4

(51) Int. Cl.
*H04L 12/24* (2006.01)
*H04L 12/26* (2006.01)
*H04L 29/08* (2006.01)

(52) U.S. Cl.
CPC ........ *H04L 41/064* (2013.01); *H04L 41/0604* (2013.01); *H04L 41/065* (2013.01);
(Continued)

(58) Field of Classification Search
CPC ............... H04L 41/064; H04L 41/0604; H04L 41/0622; H04L 41/0631; H04L 41/065;
(Continued)

(56) References Cited

U.S. PATENT DOCUMENTS 6,707,795 B1    3/2004 Noorhosseini et al.
2004/0081051 A1*    4/2004 Kimura ............ G11B 20/10009
                                                            369/53.34
(Continued)

FOREIGN PATENT DOCUMENTS

CN    101707537 A    5/2010
CN    102136949 A    7/2011
(Continued)

OTHER PUBLICATIONS

Office Action dated May 21, 2019 in Chinese Application No. 201610075817.4.
(Continued)

*Primary Examiner* — Hitesh Patel
*Assistant Examiner* — Sujana Khakural
(74) *Attorney, Agent, or Firm* — Sughrue Mion, PLLC (57) ABSTRACT

An alarm information processing method, apparatus, system, and computer storage medium are provided. The method includes receiving alarm information generated by a first node at a first time. It is determined whether the alarm information is a root alarm, and in response to a determination that the alarm information is a root alarm, a plurality of first links comprising the first node are obtained, to generate a first link set. The plurality of first links of the first link set are searched for one or more nodes located before
(Continued)

the first node, and alarm information is generated within a first time range before the first time and a second time range after the first time, to obtain a second node. Alarm root source analysis is performed on the second node, and an analysis result is notified.

17 Claims, 5 Drawing Sheets

(52) U.S. Cl.
CPC ........ *H04L 41/069* (2013.01); *H04L 41/0622* (2013.01); *H04L 41/0631* (2013.01); *H04L 41/0677* (2013.01); *H04L 43/028* (2013.01); *H04L 67/10* (2013.01); *H04L 67/1061* (2013.01)

(58) Field of Classification Search
CPC .............. H04L 41/0677; H04L 41/069; H04L 43/028; H04L 67/10; H04L 67/1061
See application file for complete search history.

(56) References Cited

U.S. PATENT DOCUMENTS

| | | | |
|---|---|---|---|
| 2004/0119590 A1 | 6/2004 | Wang | |
| 2008/0114581 A1* | 5/2008 | Meir | H04L 41/12 703/13 |
| 2009/0313198 A1* | 12/2009 | Kudo | H04L 41/069 706/47 |
| 2011/0141914 A1 | 6/2011 | Yang et al. | |
| 2011/0231704 A1* | 9/2011 | Ge | G06F 11/0709 714/26 |
| 2012/0072782 A1* | 3/2012 | Hughes | H04L 12/6418 714/57 |
| 2012/0093005 A1* | 4/2012 | Li | H04L 41/064 370/242 |
| 2015/0271008 A1* | 9/2015 | Jain | H04L 41/0686 714/57 |
| 2015/0288558 A1* | 10/2015 | Gates | G06F 11/079 714/57 |
| 2016/0004226 A1* | 1/2016 | Tanaka | G05B 11/42 700/80 |
| 2017/0155570 A1* | 6/2017 | Maheshwari | H04L 43/50 |

FOREIGN PATENT DOCUMENTS

| | | |
|---|---|---|
| CN | 102195826 A | 9/2011 |
| CN | 102201927 A | 9/2011 |
| CN | 102611564 A | 7/2012 |
| CN | 103713976 A | 4/2014 |
| CN | 104767648 A | 7/2015 |
| CN | 105071970 A | 11/2015 |
| CN | 105095048 A | 11/2015 |
| EP | 2 434 688 A1 | 3/2012 |
| EP | 2 725 742 A1 | 4/2014 |

OTHER PUBLICATIONS

International Search Report for PCT/CN2017/072112, dated May 2, 2017.
Communication dated Nov. 13, 2019 from the Korean Intellectual Property Office in counterpart Application No. 10-2018-7015309.
Communication dated May 8, 2019, issued by the Korean Intellectual Property Office in corresponding Korean Application No. 10-2018-7015309.
Written Opinion issued from the International Bureau in counterpart International Application No. PCT/CN2017/072112, dated May 2, 2017.
Communication dated Nov. 16, 2020, issued by the Intellectual Property Office India in application No. 201837016984.

* cited by examiner

ALARM INFORMATION PROCESSING METHOD AND APPARATUS, SYSTEM, AND COMPUTER STORAGE MEDIUM

CROSS-REFERENCE TO RELATED APPLICATION

This Application is a National Stage entry of International Patent Application No. PCT/CN2017/072112, filed on Jan. 22, 2017, which claimed priority from Chinese Patent Application No. 2016100758174, filed in the Chinese Patent Office on Feb. 3, 2016, the disclosures of each of which are herein incorporated by reference in their entirety.

BACKGROUND

1. Field

The present disclosure relates to the field of communications technologies, and specifically to an alarm information processing method and apparatus, a system, and a computer storage medium.

2. Description of Related Art

Clustering is a related technology in which a plurality of systems are connected together, so that a plurality of servers can operate like one machine or look like one machine. By using the clustering technology, stability of a system and a data processing capability and a service capability of a network center can be improved.

An application in a clustering technology is run only on one server. If this application has a fault, another server restarts the application, and takes over a data area located on a shared disk chassis, so that the application normally operates again. However, an entire application switching process needs to consume a period of time. Consequently, a delay is caused, and performance of the entire clustering system is affected. Therefore, it is advantageous to learn of a device fault or a system anomaly in advance. Therefore, an alarm technology is put forward in the existing technology. That is, when a device has a fault or a clustering system is in an abnormal operating state due to some reasons, the clustering system can generate alarm information according to different types of faults and faults occurring in different modules, then perform alarm analysis based on these pieces of alarm information, and notify an analysis result to a user, so that the user may process the faults or anomalies in time.

SUMMARY

It is an aspect to provide an alarm information processing method and apparatus, a system, and a computer storage medium, to improve integrity and accuracy of alarm analysis, so as to find a fault or an anomaly earlier in time, and thereby to facilitate improvement in stability and security of a system.

According to an aspect of one or more exemplary embodiments, there is provided an alarm information processing method. The method includes receiving alarm information generated by a first node at a first time. It is determined whether the alarm information is a root alarm, and in response to a determination that the alarm information is a root alarm, a plurality of first links comprising the first node are obtained, to generate a first link set. The plurality of first links of the first link set are searched for one or more nodes located before the first node, and alarm information is generated within a first time range before the first time and a second time range after the first time, to obtain a second node. Alarm root source analysis is performed on the second node, and an analysis result is notified.

According to other aspects of one or more exemplary embodiments, there is also provided an alarm information processing apparatus and a non-transitory computer readable storage medium consistent with the method.

BRIEF DESCRIPTION OF THE DRAWINGS

Exemplary embodiments will be described with reference to the accompanying drawings, in which.

DETAILED DESCRIPTION

The following clearly and completely describes technical solutions in the exemplary embodiments with reference to the accompanying drawings in which the exemplary embodiments are shown. The described exemplary embodiments are merely some but not all of the exemplary embodiments. All other exemplary embodiments obtained by a person skilled in the art based on the exemplary embodiments without creative efforts shall fall within the scope of protection of the present disclosure.

In a process of researching and practicing the conventional art alarm technology, the inventors of the present disclosure found that many conventional alarms are often delayed due to various reasons. Consequently, when alarm analysis is performed subsequently, complete alarm information cannot be obtained in time, and thus finally the analysis is not accurate. As a result, faults and/or anomalies can be found in time, and stability and security of the system are affected.

The exemplary embodiments provide an alarm information processing method and apparatus, and a system therefor that addresses these disadvantages with the conventional alarm technology.

Figure 1A:
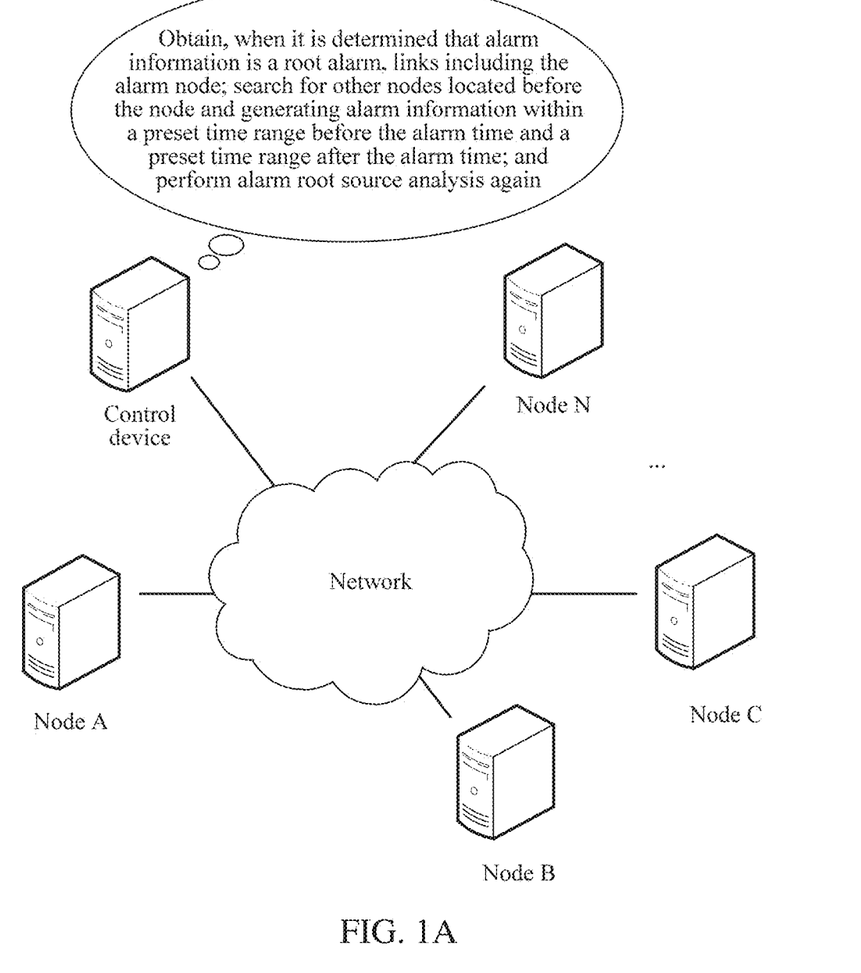
FIG. 1A is a schematic diagram of a scenario of a clustering system according to an exemplary embodiment.

Referring to FIG. 1A, a clustering system may include a Control device, and the Control device may include an alarm information processing apparatus provided according to the exemplary embodiments described herein. Moreover, the clustering system may further include a plurality of nodes such as a Node A, a Node B, a Node C, . . . , and a Node N, and these nodes are configured to process data in the clustering system, so as to provide a corresponding service, and may generate alarm information when it is determined that there is a fault or an anomaly, and send the alarm information to the Control device. Moreover, after receiving the alarm information, the Control device may: determine the alarm information; and if it is determined that the alarm information is a root alarm, obtain links including the alarm node (for example, if the node A sends alarm information, the node A is an alarm node), search, in the link, for nodes located before the alarm node, and generating alarm information within a preset time range before the alarm time and a preset time range after the alarm time, for example, within eight time windows before the alarm time as a reference and four time windows after the alarm time as a reference (in other words, the alarm time is used as a reference time), and then perform alarm root source analysis on these nodes again, and notify an analysis result to a user; or if it is determined that the alarm information is not a root alarm, may directly ignore the alarm information.

Detailed descriptions are provided below.

Exemplary Embodiment 1

In this exemplary embodiment, description is performed from the perspective of an alarm information processing apparatus, the alarm information processing apparatus may be specifically integrated in a Control device of a clustering system, and the Control device may be specifically a device such as a control server or a regulation server.

An alarm information processing method includes: receiving alarm information generated by a first node at a first time; obtaining, when it is determined that the alarm information is a root alarm, links including the first node, to obtain a first link set; searching, in the links of the first link set, for nodes located before the first node and generating alarm information within a preset time range before the first time and a preset time range after the first time, to obtain a second node; and performing alarm root source analysis on the second node, and notifying an analysis result to a user. For example, the analysis result may be inserted in a message and transmitted to a user.

Figure 1B:
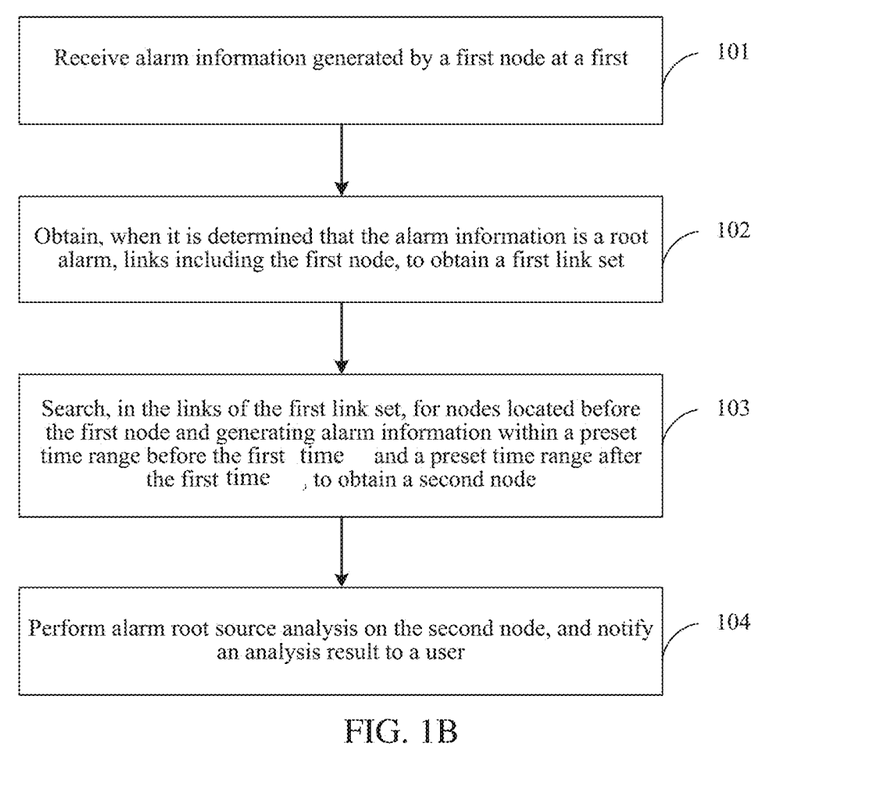
FIG. 1B is a flowchart of an alarm information processing method according to an exemplary embodiment.

As shown in FIG. 1B, a specific procedure of the alarm information processing method may be as follows:

101. Receive alarm information generated by a first node at a first time.

It should be noted that because a delay may be generated, a time point (that is, the first time) at which the first node generates the alarm information and a time point at which the alarm information is sent may be different. For example, alarm information generated by a node $C_0$ at 12:00 may be sent only at 12:30.

102. Obtain, when it is determined that the alarm information is a root alarm, links (service links) including the first node, to obtain a first link set.

Content of the root alarm may be specifically set according to an actual application requirement. For example, the root alarm may include alarms such as a node publishing change, a node machine packet loss, a program crash at a node, a machine crash at a node and/or a private line congestion at a node. That is, the step of "obtaining, when it is determined that the alarm information is a root alarm, links including the first node, to obtain a first link set" may be specifically obtaining, when it is determined that the alarm information indicates a node publishing change, a node machine packet loss, a program crash at a node, a machine crash at a node and/or a private line congestion at a node, the links including the first node, to obtain the first link set.

For example, if the alarm information is sent by the node $C_0$, links including the node $C_0$ may be obtained, and then these links including the node $C_0$ are added to the first link set.

103. Search, in the links of the first link set, for nodes located before the first node and generating alarm information within a preset time range before the first time and a preset time range after the first time, to obtain a second node.

The time range may be set according to an actual application requirement, for example, may be set to be within eight time windows before a time window of the first time as a reference window and four time windows after the reference window. That is, the step of "searching, in the links, for nodes located before the first node and generating alarm information within a preset time range before the first time and a preset time range after the first time, to obtain a second node" may be specifically searching, in the links of the first link set, for nodes located before the first node, to obtain candidate nodes; and searching, in the candidate nodes, for nodes generating alarm information within eight time windows before the first time and four time windows after the first time, to obtain the second node.

The size of the time window may be set according to an actual application requirement.

For example, description is performed by using an example in which the first node is the node $C_0$, and one time window is 5 minutes. If a time point at which the node $C_0$ generates alarm information is 12:00, nodes located before $C_0$ may be searched for in these links (that is, the links of the first link set), to obtain candidate nodes, and then nodes (that is, alarm nodes) such as a node A, a node B, and a node D generating alarm information between 11:20 and 12:20 are searched for in these candidate nodes. In this case, it may be determined that second nodes are: the node A, the node B, and the node D.

104. Perform alarm root source analysis on the second node, and notify an analysis result to a user, which may be, for example, as follows:

(1) Extract Links including the second node, to obtain a second link set.

For example, an example in which the second node is the node A is used. In this case, links includes the node A may be obtained, to obtain a second link set.

(2) Filter the links in the second link set according to an invoking relationship of the second node, to obtain a valid link.

For example, an example in which the second node is the node A is still used. In this case, filtering may be performed according to a scheduling relationship and a scheduled relationship of the node A. For example, if a next hop of the node A is scheduled by three nodes, that is, a node $B_0$, a node $B_2$, and a node $B_4$, links including "A→$B_0$", "A→$B_2$", and "A→$B_4$" may be extracted from the second link set, to obtain a valid link, and other invalid links not including "A→$B_0$", "A→$B_2$", or "A→$B_4$" are removed through filtration.

Scheduling may include active invoking, for example, actively invoking another node; and scheduled may include passive invoking, for example, invoked by another node. For example, if the node A invokes the node B, the node A is the scheduling node relative to the node B, and the node B is the scheduled node.

(3) Perform alarm root source analysis on the second node according to the valid link, which may be, for example, as follows:

A. Determine an alarm time of the second node, to obtain a second time.

B. Obtain, from the valid link, nodes generating alarm information within a preset time range before the second time and a preset time range after the second time, to obtain a third node.

The time range may be set according to an actual application requirement. For example, a time window of the second time may be used as a reference time; and nodes generating alarm information within eight time windows before the reference time and four time windows after the reference time are determined in the valid link, to obtain the third node.

The size of the time window may be set according to an actual application requirement.

In an implementation of this exemplary embodiment, for convenience of managing an alarm node, an alarm module receiving pool may be set, and configured to manage each alarm node and alarm information generated by each alarm node, where the alarm module receiving pool may include a plurality of alarm modules, and each alarm module corresponds to one alarm node.

For example, an example in which the alarm module receiving pool is disposed in the alarm information processing apparatus is used. In this case, the step of "obtaining, from the valid link, nodes generating alarm information within a preset time range before the second time and a preset time range after the second time, to obtain a third node" may be specifically as follows:

(a) Obtain, from the alarm module receiving pool, modules generating alarm information within a preset time range before the second time and a preset time range after the second time, to obtain target alarm modules.

The time range may be set according to an actual application requirement, for example, may be set to be within eight time windows before a time window of the second time as a reference window and four time windows after the reference window. That is, the step of "obtaining, from the alarm module receiving pool, modules generating alarm information within a preset time range before the second time and a preset time range after the second time are, to obtain target alarm modules" may be specifically as follows:

The time window of the second time may be used as a reference, and modules generating alarm information within eight time windows before the reference window and four time windows after the reference window are obtained from the alarm module receiving pool, to obtain target alarm modules.

The size of the time window may be set according to an actual application requirement.

For example, description is performed by using an example in which the second time is 12:00 and one time window is 5 minutes. In this case, modules generating alarm information between 11:20 and 12:20 may be obtained from the alarm module receiving pool, to obtain target alarm modules. For example, respective module identifiers of the target alarm modules are A and $D_2$.

(b) Superpose the target alarm modules and the valid link, so as to determine nodes generating alarm information within a preset time range before the second time and a preset time range after the second time, to obtain a third node.

For example, after the superposition, a node corresponding to the target alarm module A is the node A, and a node corresponding to the target alarm module $D_2$ is a node $D_2$. In this case, it may be determined that third nodes are the node A and the node $D_2$.

C. Analyze alarm content of the third node, so as to determine whether the alarm content is a root alarm, and if the alarm content is a root alarm, perform step D (see below), or if the alarm content is not a root alarm, perform step E (see below).

For example, the alarm content of the third node may be analyzed, so as to determine whether the alarm content includes any one of the node publishing change, the node machine packet loss, the program crash at a node, the machine crash at a node, and the private line congestion at a node; and if the alarm content includes any one of the node publishing change, the node machine packet loss, the program crash at a node, the machine crash at a node, and the private line congestion at a node, it is determined that the alarm content is a root alarm; or if the alarm content does not include any of the node publishing change, the node machine packet loss, the program crash at a node, the machine crash at a node, and the private line congestion at a node, it is determined that the alarm content is not a root alarm.

D. When it is determined that the alarm content is a root alarm, use the third node as the first node, and return to perform the step of obtaining links including the first node, that is, return to perform step 102, and perform analysis in the foregoing manner (that is, method of steps 102 to 104).

E. When it is determined that the alarm content is not a root alarm, perform the step of writing an analysis result to a database table and notifying the analysis result to the user, that is, perform step (4) of step 104, which is as follows:

(4) Write an analysis result to a database table, and notify the analysis result to the user.

It can be learned from the foregoing that, according to this exemplary embodiment, after alarm information generated by a first node at a first time is received, if it is determined that the alarm information is a root alarm, links including the first node are obtained, to obtain a first link set. Nodes located before the first node and generating alarm information within a preset time range before the first time and a preset time range after the first time are searched for in the links of the first link set, to obtain a second node. Then, alarm root source analysis is performed on the second node again, and an analysis result is notified to a user, thereby dynamically analyzing a root source of an alarm, so as to remedy a problem of inaccurate analysis caused due to delayed sending of some pieces of alarm information, and greatly improve integrity and accuracy of alarm analysis, so that the user may find a fault or an anomaly in time, to facilitate improvement in stability and security of a system.

Exemplary Embodiment 2

According to the method described in Exemplary Embodiment 1, the following further provides detailed descriptions by using an example.

In this exemplary embodiment, description is performed by using an example in which the alarm information processing apparatus is specifically integrated in a Control device of a clustering system.

Figure 2A:
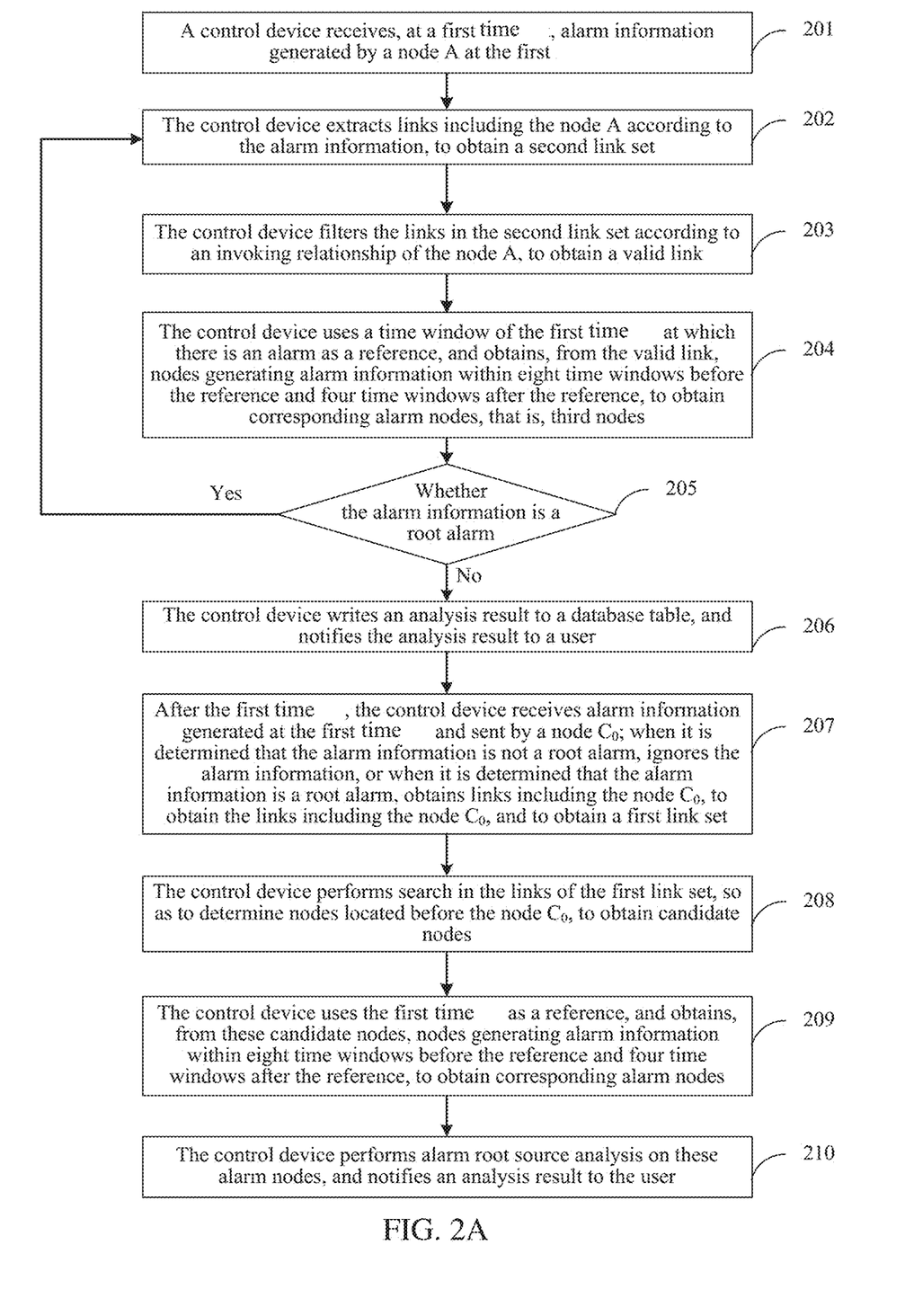
FIG. 2A is another flowchart of an alarm information processing method according to an exemplary embodiment.

As shown in FIG. 2A, a specific procedure of an alarm information processing method may be as follows:

201. The control device receives, at a first time, alarm information generated by a node A at the first time.

For example, at 12:00, the control device receives alarm information generated by the node A at 12:00.

202. The control device extracts links including the node A according to the alarm information, to obtain a second link set.

Figure 2B:
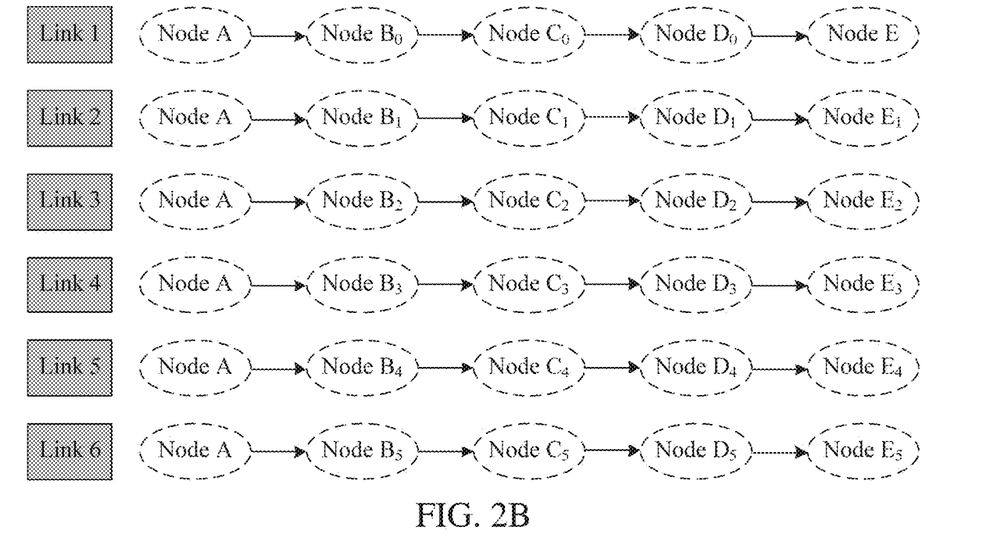
FIG. 2B is a schematic diagram of links in an alarm information processing method according to an exemplary embodiment.

For example, referring to FIG. 2B, the second link set may include six links that are as follows:

link 1 (Link 1): node A→node $B_0$→node $C_0$→node $D_0$→node E;

link 2 (Link 2): node A→node $B_1$→node $C_1$→node $D_0$→node $E_1$;

link 3 (Link 3): node A→node $B_2$→node $C_2$→node $D_2$→node $E_2$;

link 4 (Link 4): node A→node $B_3$→node $C_3$→node $D_3$→node $E_3$;

link 5 (Link 5): node A→node $B_4$→node $C_4$→node $D_4$→node $E_4$; and link 6 (Link 6): node A→node $B_5$→node $C_5$→node $D_5$→node $E_5$.

203. The control device filters the links in the second link set according to an invoking relationship of the node A, to obtain a valid link.

Figure 2C:
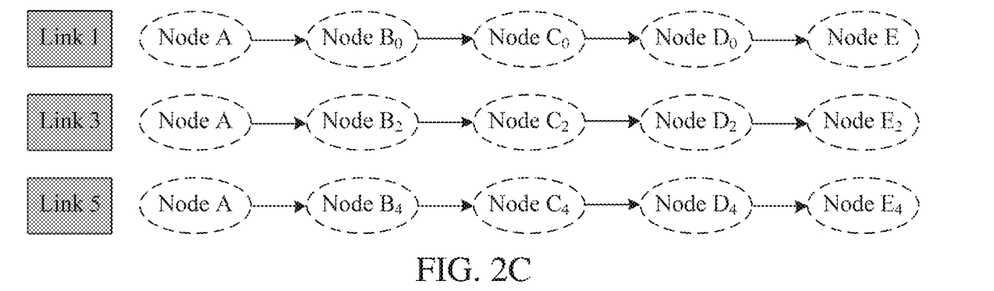
FIG. 2C is a schematic diagram of links after filtering in an alarm information processing method according to an exemplary embodiment.

For example, filtering may be performed according to a scheduling relationship and a scheduled relationship of the node A. For example, if a next hop of the node A is scheduled by three nodes, that is, a node $B_0$, a node $B_2$, and a node $B_4$, referring to FIG. 2C, corresponding links may be extracted from the second link set, and are as follows:

link 1 (Link 1): node A→node $B_0$→node $C_0$→node $D_0$→node E;

link 3 (Link 3): node A→node $B_2$→node $C_2$→node $D_2$→node $E_2$; and link 5 (Link 5): node A→node $B_4$→node $C_4$→node $D_4$→node $E_4$.

204. The control device uses a time window of the first time such as 12:00 at which there is an alarm as a reference time, and obtains, from the valid link, nodes generating alarm information within eight time windows before the reference time and four time windows after the reference time, to obtain corresponding alarm nodes, that is, third nodes. This may be, for example, as follows:

(1) The control device uses a time window of the first time such as 12:00 at which there is an alarm as a reference window, and obtains, from an alarm module receiving pool, modules generating alarm information within eight time windows before the reference window and four time windows after the reference window, to obtain target alarm modules.

The size of the time window may be set according to an actual application requirement. For example, an example in which one time window is 5 minutes is used. In this case, modules generating alarm information between 11:20 and 12:20 may be obtained from the alarm module receiving pool, to obtain target alarm modules.

For example, between 11:20 and 12:20, the alarm module receiving pool may be specifically shown in Table 1:

TABLE 1

| Time | Module ID | Alarm type |
|---|---|---|
| 11:30 | $D_2$ | automation test alarm |
| 11:35 | $A_3$ | disk alarm |
| 11:40 | $B_2$ | process alarm |
| 11:45 | $B_4$ | process alarm |
| 11:50 | $A_5$ | process alarm |
| 12:10 | $C_4$ | process alarm |
| 12:00 | A | module scheduling alarm |
| ... | ... | ... |

For example, within these 12 time windows, there is an alarm for five modules A, $B_2$, $D_2$, $B_4$, and $C_4$ in the alarm module receiving pool. Therefore, target alarm modules: module A, module $B_2$, module $D_2$, module $B_4$, and module $C_4$ may be obtained.

(2) The control device superposes the target alarm modules and the valid link, so as to determine corresponding alarm nodes (that is, third nodes).

Figure 2D:
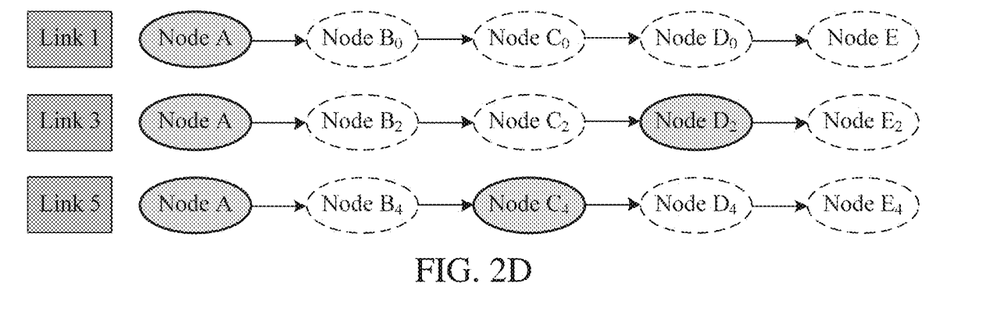
FIG. 2D is a schematic diagram of links after superposition of an alarm module and a link in an alarm information processing method according to an exemplary embodiment.

For example, an example in which target alarm modules include the module A, the module $B_2$, the module $D_2$, the module $B_4$, and the module $C_4$ is used. In this case, after the target alarm modules and the valid link are superposed, corresponding alarm nodes (that is, third nodes) may be obtained, and are specifically: the node A, the node $B_2$, the node $D_2$, the node $B_4$, and the node $C_4$. Referring to FIG. 2D, nodes represented by solid lines are alarm nodes. Because the node $B_2$ is located before the node $D_2$, and the node $B_4$ is located before the node $C_4$, the node A, the node $B_2$, the node $D_2$, the node $B_4$, and the node $C_4$ may be all analyzed, or only the node $D_2$ and the node $C_4$ may be analyzed (that is, step 205 is performed).

205. The control device analyzes alarm content of these alarm nodes (that is, third nodes), so as to determine whether the alarm content is a root alarm, and if the alarm content is a root alarm, performs step 202, or if the alarm content is not a root alarm, performs step 206.

For example, the alarm content of these alarm nodes (that is, the third nodes) may be analyzed, so as to determine whether the alarm content includes any one of alarms such as the node publishing change, the node machine packet loss, the program crash at a node, the machine crash at a node, and the private line congestion at a node; and if the alarm content includes any one of alarms such as the node publishing change, the node machine packet loss, the program crash at a node, the machine crash at a node, and the private line congestion at a node, it is determined that the alarm content is a root alarm; or if the alarm content does not include any alarms such as the node publishing change, the node machine packet loss, the program crash at a node, the machine crash at a node, and the private line congestion at a node, it is determined that the alarm content is not a root alarm.

Figure 2E:
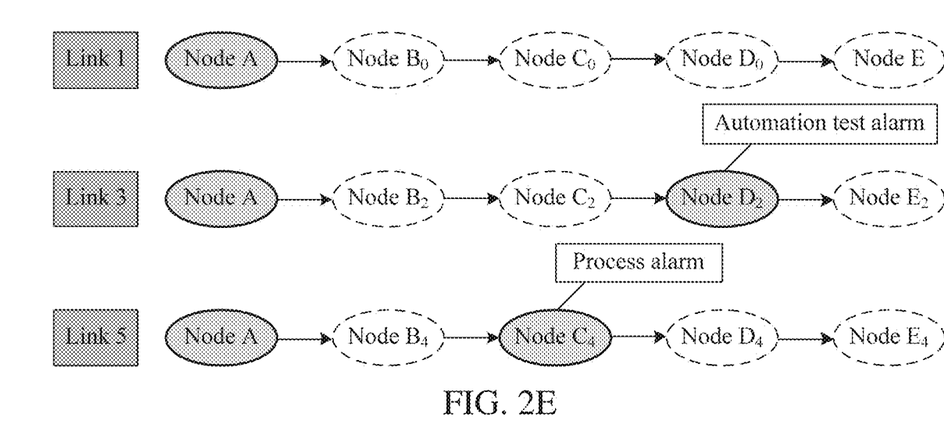
FIG. 2E is a schematic diagram of links on which alarm root source analysis is performed in an alarm information processing method according to an exemplary embodiment.

For example, referring to FIG. 2E, using the alarm nodes $C_4$ and $D_2$ as an example, because there is a process alarm at the alarm node $C_4$, there is an automation test alarm at the alarm node $D_2$, and neither of the alarms is a root alarm, step 206 may be performed.

206. Because neither of the alarms is a root alarm, the control device writes an analysis result to a database table and notifies the analysis result to a user.

207. After the first time, for example, at 12:30, the control device receives alarm information generated at the first time, that is, 12:00 and sent by a node $C_0$ (that is, a first node); when it is determined that the alarm information is not a root alarm, ignores the alarm information, or when it is determined that the alarm information is a root alarm, obtains links including the node $C_0$, to obtain the links including the node $C_0$, and to obtain a first link set; and then performs step 208.

Figure 2F:
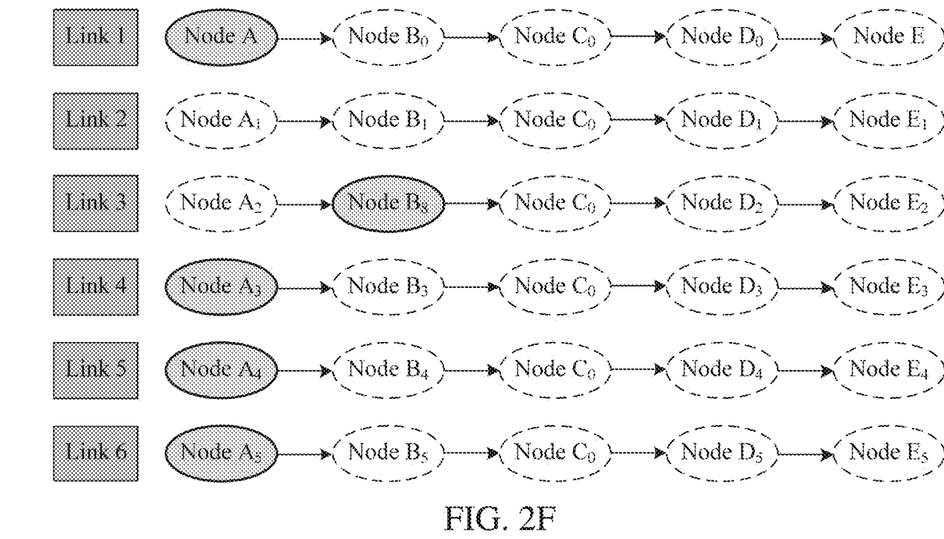
FIG. 2F is a schematic diagram of links in an alarm information processing method according to an exemplary embodiment.

For example, referring to FIG. 2F, the first link set may include six links that are as follows:

link 1 (Link 1): node A→node $B_0$→node $C_0$→node $D_0$→node E;

link 2 (Link 2): node $A_1$→node $B_1$→node $C_0$→node $D_1$→node $E_1$;

link 3 (Link 3): node $A_2$→node $B_8$→node $C_0$→node $D_2$→node $E_2$;

link 4 (Link 4): node $A_3 \rightarrow$ node $B_3 \rightarrow$ node $C_0 \rightarrow$ node $D_3 \rightarrow$ node $E_3$;

link 5 (Link 5): node $A_4 \rightarrow$ node $B_4 \rightarrow$ node $C_0 \rightarrow$ node $D_4 \rightarrow$ node $E_4$; and link 6 (Link 6): node $A_5 \rightarrow$ node $B_5 \rightarrow$ node $C_0 \rightarrow$ node $D_5 \rightarrow$ node $E_5$.

208. The control device performs search in the links of the first link set obtained in step 207, so as to determine nodes located before the node $C_0$, to obtain candidate nodes, and then performs step 209.

209. The control device uses a time window in which there is an alarm at 12:00 (that is, a time point at which the node $C_0$ generates the alarm, that is, the first time) as a reference window, obtains, from these candidate nodes, nodes generating alarm information within eight time windows before the reference window and four time windows after the reference window, to obtain corresponding alarm nodes (that is, second nodes), and then performs step 210.

The size of the time window may be set according to an actual application requirement. For example, an example in which one time window is 5 minutes is used. In this case, nodes generating alarm information between 11:20 and 12:20 may be obtained. For example, the nodes may include: the node A, the node $B_8$, the node $A_3$, the node $A_4$ and the node $A_5$, referring to FIG. 2F.

210. The control device performs alarm root source analysis on these alarm nodes such as the node A, the node $B_8$, the node $A_3$, the node $A_4$, and the node $A_5$ again, and notifies an analysis result to the user.

That is, alarm root source analysis is performed on these alarm nodes such as the node A, the node $B_8$, the node $A_3$, the node $A_4$, and the node $A_5$ again in the manner of steps 202 to 206, a new analysis result is written to the database table, and a new analysis result is notified to the user.

It can be learned from the foregoing that, according to this exemplary embodiment, after alarm information generated by an alarm node is received, whether the alarm information is a root alarm is determined, if it is determined that the alarm information is a root alarm, links including the alarm node are obtained, to obtain a first link set. Nodes located before the alarm node and generating alarm information within a preset time range before a time point at which the alarm node generates an alarm and a preset time range after the time point are searched for in the links of the first link set, to obtain corresponding other nodes. Then, alarm root source analysis is performed on these other nodes again, and an analysis result is notified to a user, thereby dynamically analyzing a root source of an alarm, so as to remedy a problem of inaccurate analysis caused due to delayed sending of some pieces of alarm information, and greatly improve integrity and accuracy of alarm analysis, so that the user may find a fault or an anomaly in time, to facilitate improvement in stability and security of a system.

Exemplary Embodiment 3

Figure 3:
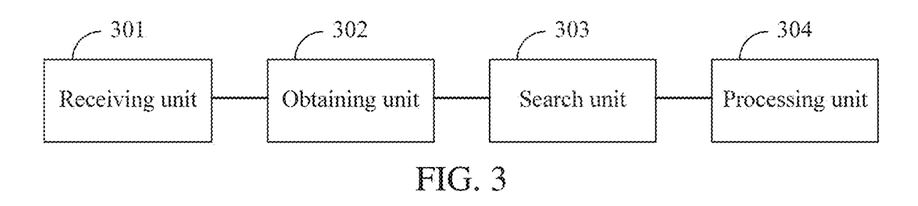
FIG. 3 is a schematic structural diagram of an alarm information processing apparatus according to an exemplary embodiment.

To implement the foregoing method, this exemplary embodiment further provides an alarm information processing apparatus. As shown in FIG. 3, the alarm information processing apparatus includes: a receiving unit 301, an obtaining unit 302, a search unit 303, and a processing unit 304 that are as follows:

(1) Receiving Unit 301

The receiving unit 301 is configured to receive alarm information generated by a first node at a first time.

It should be noted that because a delay may be generated, a time point (that is, the first time) at which the first node generates the alarm information and a time point at which the alarm information is sent may be different. For example, alarm information generated by a node $C_0$ at 12:00 may be sent only at 12:30.

(2) Obtaining Unit 302

The obtaining unit 302 is configured to obtain, when it is determined that the alarm information is a root alarm, links including the first node, to obtain a first link set.

Content of the root alarm may be specifically set according to an actual application requirement. For example, the root alarm may include alarms such as a node publishing change, a node machine packet loss, a program crash at a node, a machine crash at a node and/or a private line congestion at a node. That is, the obtaining unit 302 may be specifically configured to obtain, when it is determined that the alarm information indicates a node publishing change, a node machine packet loss, a program crash at a node, a machine crash at a node and/or a private line congestion at a node, the links including the first node, to obtain the first link set.

(3) Search Unit 303

The search unit 303 is configured to search, in the links of the first link set, for nodes located before the first node and generating alarm information within a preset time range before the first time and a preset time range after the first time, to obtain a second node.

The time range may be set according to an actual application requirement, for example, may be set to be within eight time windows before a time window of the first time as a reference window and four time windows after the reference window. That is, the search unit 303 may be specifically configured to search, in the links, for nodes located before the first node, to obtain candidate nodes; and search, in the candidate nodes, for nodes generating alarm information within eight time windows before the first time and four time windows after the first time, to obtain the second node.

The size of the time window may be set according to an actual application requirement.

For example, description is performed by using an example in which the first node is the node $C_0$, and one time window is 5 minutes. If a time point at which the node $C_0$ generates alarm information is 12:00, nodes located before $C_0$ may be searched for in these links, to obtain candidate nodes, and then nodes (that is, alarm nodes) such as a node A, a node B, and a node D generating alarm information between 11:20 and 12:20 are searched for in these candidate nodes. In this case, it may be determined that second nodes are: the node A, the node B, and the node D.

(4) Processing Unit 304

The processing unit 304 is configured to perform alarm root source analysis on the second node, and notify an analysis result to a user.

For example, the processing unit 304 may include an extraction subunit, a filtering subunit, an analysis subunit, and a notification subunit that are as follows:

The extraction subunit is configured to extract links including the second node, to obtain a second link set;

The filtering subunit is configured to filter the links in the second link set according to an invoking relationship of the second node, to obtain a valid link;

The analysis subunit is configured to perform alarm root source analysis on the second node according to the valid link; and The notification subunit is configured to write an analysis result to a database table, and notify the analysis result to the user.

For example, the analysis subunit may be specifically configured to: determine an alarm time of the second node, to obtain a second time; obtain, from the valid link, nodes generating alarm information within a preset time range before the second time and a preset time range after the second time, to obtain a third node; analyze alarm content of the third node, so as to determine whether the alarm content is a root alarm; and if the alarm content is a root alarm, use the third node as the first node, and trigger the obtaining unit to perform the operation of obtaining links including the first node; or if the alarm content is not a root alarm, trigger the notification subunit to perform the operation of writing an analysis result to a database table and notifying the analysis result to the user.

The preset time range may be set according to an actual application requirement, for example, may be set to be within eight time windows before a time window of the second time as a reference window and four time windows after the reference window. That is, the analysis subunit may be specifically configured to use a time window of the second time as a reference window; and obtain, from the valid link, nodes generating alarm information within eight time windows before the reference and four time windows after the reference window, to obtain the third node.

In an implementation of this exemplary embodiment, for convenience of managing an alarm node, an alarm module receiving pool may be set, and configured to manage each alarm node and alarm information generated by each alarm node, where the alarm module receiving pool may include a plurality of alarm modules, and each alarm module corresponds to one alarm node.

For example, an example in which the alarm module receiving pool is disposed in the alarm information processing apparatus is used. In this case, the analysis subunit may be specifically configured to obtain, from the alarm module receiving pool, modules generating alarm information within a preset time range before the second time and a preset time range after the second time, to obtain target alarm modules; and superpose the target alarm modules and the valid link, so as to determine nodes generating alarm information within a preset time range before the second time and a preset time range after the second time, to obtain a third node.

Moreover, it should be noted that alternatively, the root alarm may be set according to an actual application requirement. For example, the root alarm may include a node publishing change, a node machine packet loss, a program crash at a node, a machine crash at a node, a private line congestion at a node, and the like. That is, the analysis subunit may be specifically configured to analyze the alarm content of the third node, so as to determine whether the alarm content includes any one of the node publishing change, the node machine packet loss, the program crash at a node, the machine crash at a node, and the private line congestion at a node; and if the alarm content includes any one of the node publishing change, the node machine packet loss, the program crash at a node, the machine crash at a node, and the private line congestion at a node, determine that the alarm content is a root alarm; or if the alarm content does not include any of the node publishing change, the node machine packet loss, the program crash at a node, the machine crash at a node, and the private line congestion at a node, determine that the alarm content is not a root alarm.

In a specific implementation, the foregoing units may be implemented as independent entities, or may be combined arbitrarily, or may be implemented as a same entity or several entities. Additionally, it will be appreciated that any of the above-described units or subunits may be implemented by one or more microprocessors included in the Control device. For specific implementations of the foregoing units, refer to the foregoing method embodiments. Details are not described herein again.

The alarm information processing apparatus may be specifically integrated in a Control device of a clustering system, and the Control device may be specifically a device such as a control server or a regulation server, which includes various microprocessor(s), memories, and storage devices, etc.

It can be learned from the foregoing that, according to the alarm information processing apparatus of this exemplary embodiment, after alarm information generated by a first node at a first time is received, if it is determined that the alarm information is a root alarm, the obtaining unit 302 obtains links including the first node, to obtain a first link set. The search unit 303 searches, in the links of the first link set, for nodes located before the first node and generating alarm information within a preset time range before the first time and a preset time range after the first time, to obtain a second node. Then, the processing unit 304 performs alarm root source analysis on the second node again, and notifies an analysis result to a user, thereby dynamically analyzing a root source of an alarm, so as to remedy a problem of inaccurate analysis caused due to delayed sending of some pieces of alarm information, and greatly improve integrity and accuracy of alarm analysis, so that the user may find a fault or an anomaly in time, to facilitate improvement in stability and security of a system.

Exemplary Embodiment 4

Correspondingly, this exemplary embodiment further provides a clustering system that may include any alarm information processing apparatus according to the exemplary embodiments described above. For details, refer to Exemplary Embodiment 3. For example, the details may be as follows:

The alarm information processing apparatus is configured to: receive alarm information generated by a first node at a first time; obtain, when it is determined that the alarm information is a root alarm, links including the first node, to obtain a first link set; search, in the links of the first link set, for nodes located before the first node and generating alarm information within a preset time range before the first time and a preset time range after the first time, to obtain a second node; and perform alarm root source analysis on the second node, and notify an analysis result to a user.

Content of the root alarm may be specifically set according to an actual application requirement. For example, the root alarm may include alarms such as a node publishing change, a node machine packet loss, a program crash at a node, a machine crash at a node and/or a private line congestion at a node.

Moreover, the time range may also be set according to an actual application requirement, for example, may be set to be within eight time windows before a time window of the first time as a reference window and four time windows after the reference window, where the size of the time window may be flexibly set, and details are not described herein again.

The alarm information processing apparatus may be specifically integrated in a Control device of a clustering system, and the Control device may be specifically a device such as a control server or a regulation server.

Moreover, the clustering system may further include other devices, for example, may include a plurality of servers, and these servers may serve as nodes of the clustering system and include various microprocessor(s), memories, and storage devices, where each server may perform the following operation:

processing data in the clustering system, so as to provide a corresponding service, generating alarm information when it is determined that there is a fault or an anomaly, and sending the alarm information to the alarm information processing apparatus (such as the Control device).

For specific implementation of the foregoing devices, refer to the foregoing method exemplary embodiment, and details are not described herein again.

Because the clustering system may include any alarm information processing apparatus provided in the exemplary embodiments, beneficial effects of any alarm information processing apparatus provided in the exemplary embodiments can be implemented. For details, refer to the foregoing exemplary embodiments, and details are not described herein again.

An exemplary embodiment further provides a non-transitory computer readable storage medium, the computer storage medium storing computer executable instructions, and the computer executable instructions being coded to perform the foregoing alarm information processing method according to the various exemplary embodiments described above.

A person of ordinary skill in the art may understand that all or part of the steps of the methods in the foregoing exemplary embodiments may be implemented by a program instructing relevant hardware. The program may be stored in a computer readable storage medium. The storage medium may include: a read-only memory (ROM), a random access memory (RAM), a magnetic disk, an optical disc, or the like.

The alarm information processing method, apparatus, and system provided in the exemplary embodiments are described above in detail. Although the principles and implementations of the present disclosure are described by using specific exemplary embodiments in the specification, the foregoing descriptions of the exemplary embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

Exemplary embodiments provide an alarm information processing method and apparatus, a system, and a computer storage medium, to improve integrity and accuracy of alarm analysis, so as to find a fault or an anomaly earlier in time, and thereby to facilitate improvement in stability and security of a system.

An exemplary embodiment provides an alarm information processing method, including:

receiving alarm information generated by a first node at a first moment;

obtaining, when it is determined that the alarm information is a root alarm, links including the first node, to obtain a first link set;

searching, in the links of the first link set, for nodes located before the first node and generating alarm information within a preset time range before the first moment and a preset time range after the first moment, to obtain a second node; and performing alarm root source analysis on the second node, and notifying an analysis result to a user.

Correspondingly, an exemplary embodiment further provides an alarm information processing apparatus, including:

a receiving unit, configured to receive alarm information generated by a first node at a first moment, to obtain a first link set;

an obtaining unit, configured to obtain, when it is determined that the alarm information is a root alarm, links including the first node;

a search unit, configured to search, in the links of the first link set, for nodes located before the first node and generating alarm information within a preset time range before the first moment and a preset time range after the first moment, to obtain a second node; and a processing unit, configured to perform alarm root source analysis on the second node, and notify an analysis result to a user.

When performing processing, the receiving unit, the obtaining unit, the search unit, the processing unit may be implemented by using a central processing unit (CPU), a digital signal processor (DSP), or a field-programmable gate array (FPGA).

In addition, an exemplary embodiment further provides a clustering system, including any alarm information processing apparatus according to the exemplary embodiments discussed above.

An exemplary embodiment further provides a computer storage medium, the computer storage medium storing a computer executable instruction, and the computer executable instruction being configured to perform the foregoing alarm information processing method.

According to the exemplary embodiments, after alarm information generated by a first node at a first moment is received, if it is determined that the alarm information is a root alarm, links including the first node are obtained, to obtain a first link set. Nodes located before the first node and generating alarm information within a preset time range before the first moment and a preset time range after the first moment are searched for in the links of the first link set, to obtain a second node. Then, alarm root source analysis is performed on the second node again, and an analysis result is notified to a user, thereby dynamically analyzing a root source of an alarm, so as to remedy a problem of inaccurate analysis caused due to delayed sending of some pieces of alarm information, and greatly improve integrity and accuracy of alarm analysis, so that the user may find a fault or an anomaly earlier in time, to facilitate improvement in stability and security of a system According to the exemplary embodiments, after alarm information generated by a first node at a first time is received, if it is determined that the alarm information is a root alarm, links including the first node are obtained, to obtain a first link set. Nodes located before the first node and generating alarm information within a preset time range before the first time and a preset time range after the first time are searched for in the links of the first link set, to obtain a second node. Then, alarm root source analysis is performed on the second node again, and an analysis result is notified to a user, thereby dynamically analyzing a root source of an alarm, so as to remedy a problem of inaccurate analysis caused due to delayed sending of some pieces of alarm information, and greatly improve integrity and accuracy of alarm analysis, so that the user may find a fault or an anomaly in earlier time, to facilitate improvement in stability and security of a system.

What is claimed is:

1. A method performed by a control device, the method comprising:
receiving alarm information generated by a first node at a first time;
determining whether the alarm information is a root alarm;
obtaining, in response to a determination that the alarm information is a root alarm, a plurality of first links comprising the first node, to generate a first link set;
searching, in the plurality of first links of the first link set, for one or more nodes located before the first node, and generating alarm information within a first time range before the first time and a second time range after the first time, to obtain a second node;
extracting a plurality of second links comprising the second node, to generate a second link set;
filtering the plurality of second links in the second link set according to an invoking relationship with the second node, to obtain a valid link, the invoking relationship including nodes that the second node invokes and nodes that invoke the second node; and
performing alarm root source analysis on the second node according to the valid link, and notifying an analysis result,
wherein the performing alarm root source analysis on the second node according to the valid link comprises:
determining an alarm time of the second node, to obtain a second time;
obtaining, from the valid link, one or more alarm generating nodes that generate alarm information within a preset time range before the second time and a preset time range after the second time, to obtain a third node;
analyzing alarm content of the third node, to determine whether the alarm content is a root alarm; and
when the alarm content is a root alarm, using the third node as the first node, and returning to perform the operation of obtaining the plurality of first links comprising the first node; and
when the alarm content is not a root alarm, writing the analysis result to a database table and notifying the analysis result.

2. The method according to claim 1, wherein the obtaining the plurality of first links comprises:
obtaining, in response to a determination that the alarm information indicates one or more of a node publishing change, a node machine packet loss, a program crash at a node, a machine crash at a node or private line congestion at a node, the plurality of first links comprising the first node, to generate the first link set.

3. The method according to claim 1, wherein the searching in the plurality of first links comprises:
searching, in the plurality of first links of the first link set, for one or more prior nodes located before the first node, to obtain one or more candidate nodes; and
searching, in the one or more candidate nodes, for one or more alarm generating nodes that generate alarm information within eight time windows before the first time and within four time windows after the first time, to obtain the second node.

4. The method according to claim 1, wherein the analyzing alarm content of the third node comprises:
analyzing the alarm content of the third node to determine whether the alarm content comprises any one of a node publishing change, a node machine packet loss, a program crash at a node, a machine crash at a node, or a private line congestion at a node; and
if the alarm content comprises any one, determining that the alarm content is a root alarm; and
if the alarm content does not comprise any one, determining that the alarm content is not a root alarm.

5. The method according to claim 4, wherein the obtaining, from the valid link, one or more alarm generating nodes comprises:
using a time window of the second time as a reference window; and
determining, in the valid link, the one or more alarm generating nodes within eight time windows before the reference window and within four time windows after the reference window, to obtain the third node.

6. The method according to claim 1, wherein the searching in the plurality of first links comprises:
searching, in the plurality of first links of the first link set, for one or more prior nodes located before the first node, to obtain one or more candidate nodes; and
searching, in the one or more candidate nodes, for one or more alarm generating nodes that generate alarm information within a first number of time windows before the first time and within a second number of time windows after the first time, to obtain the second node, the first number being greater than the second number.

7. An apparatus comprising at least one microprocessor configured to:
receive alarm information generated by a first node at a first time;
determine whether the alarm information is a root alarm;
obtain, in response to a determination that the alarm information is a root alarm, a plurality of first links comprising the first node, to generate a first link set;
search, in the plurality of first links of the first link set, for one or more nodes located before the first node, and generate alarm information within a first time range before the first time and a second time range after the first time, to obtain a second node;
extract a plurality of second links comprising the second node, to generate a second link set;
filter the plurality of second links in the second link set according to an invoking relationship with the second node, to obtain a valid link, the invoking relationship including nodes that the second node invokes and nodes that invoke the second node; and
perform alarm root source analysis on the second node according to the valid link, and notify an analysis result,
wherein to perform the alarm root source analysis the at least one microprocessor is configured to:
determine an alarm time of the second node, to obtain a second time;
obtain, from the valid link, one or more alarm generating nodes that generate alarm information within a preset time range before the second time and a preset time range after the second time, to obtain a third node;
analyze alarm content of the third node, to determine whether the alarm content is a root alarm; and
when the alarm content is a root alarm, the third node is used as the first node, and the at least one microprocessor again obtains the plurality of first links comprising the first node; and
when the alarm content is not a root alarm, the at least one microprocessor writes the analysis result to a database table and notifies the analysis result.

8. The apparatus according to claim 7, wherein the plurality of first links are obtained in response to a determination that the alarm information indicates one or more of a node publishing change, a node machine packet loss, a program crash at a node, a machine crash at a node or private line congestion at a node.

9. The apparatus according to claim 7, wherein the at least one microprocessor is specifically configured to:
search, in the plurality of first links of the first link set, for one or more prior nodes located before the first node, to obtain one or more candidate nodes; and
search, in the one or more candidate nodes, for one or more alarm generating nodes that generate alarm information within eight time windows before the first time and within four time windows after the first time, to obtain the second node.

10. The apparatus according to claim 7, wherein to perform the analysis of the alarm content of the third node, the at least one microprocessor is configured to:
analyze the alarm content of the third node to determine whether the alarm content comprises any one of a node publishing change, a node machine packet loss, a program crash at a node, a machine crash at a node, or a private line congestion at a node; and
if the alarm content comprises any one, the at least one microprocessor determines that the alarm content is a root alarm; and
if the alarm content does not comprise any one, the at least one microprocessor determines that the alarm content is not a root alarm.

11. The apparatus according to claim 7, wherein to obtain, from the valid link, one or more alarm generating nodes the at least one microprocessor is configured to:
using a time window of the second time as a reference window; and
determine, in the valid link, the one or more alarm generating nodes within eight time windows before the reference window and within four time windows after the reference window, to obtain the third node.

12. The apparatus according to claim 7, wherein the at least one microprocessor is specifically configured to:
search, in the plurality of first links of the first link set, for one or more prior nodes located before the first node, to obtain one or more candidate nodes; and
search, in the one or more candidate nodes, for one or more alarm generating nodes that generate alarm information within a first number of time windows before the first time and within a second number of time windows after the first time, to obtain the second node, the first number being greater than the second number.

13. A non-transitory computer readable storage medium, storing computer executable instructions which, when executed by at least one processor, cause the at least one processor to perform:
receiving alarm information generated by a first node at a first time;
determining whether the alarm information is a root alarm;
obtaining, in response to a determination that the alarm information is a root alarm, a plurality of first links comprising the first node, to generate a first link set;
searching, in the plurality of first links of the first link set, for one or more nodes located before the first node, and generating alarm information within a first time range before the first time and a second time range after the first time, to obtain a second node;
extracting a plurality of second links comprising the second node, to generate a second link set;
filtering the plurality of second links in the second link set according to an invoking relationship with the second node, to obtain a valid link, the invoking relationship including nodes that the second node invokes and nodes that invoke the second node; and
performing alarm root source analysis on the second node according to the valid link, and notifying an analysis result,
wherein the performing alarm root source analysis on the second node according to the valid link comprises:
determining an alarm time of the second node, to obtain a second time;
obtaining, from the valid link, one or more alarm generating nodes that generate alarm information within a preset time range before the second time and a preset time range after the second time, to obtain a third node;
analyzing alarm content of the third node, to determine whether the alarm content is a root alarm; and
when the alarm content is a root alarm, using the third node as the first node, and returning to perform the operation of obtaining the plurality of first links comprising the first node; and
when the alarm content is not a root alarm, writing the analysis result to a database table and notifying the analysis result.

14. The non-transitory computer readable storage medium according to claim 13, wherein the obtaining the plurality of first links comprises:
obtaining, in response to a determination that the alarm information indicates one or more of a node publishing change, a node machine packet loss, a program crash at a node, a machine crash at a node or private line congestion at a node, the plurality of first links comprising the first node, to generate the first link set.

15. The non-transitory computer readable storage medium according to claim 13, wherein the searching in the plurality of first links comprises:
searching, in the plurality of first links of the first link set, for one or more prior nodes located before the first node, to obtain one or more candidate nodes; and
searching, in the one or more candidate nodes, for one or more alarm generating nodes that generate alarm information within eight time windows before the first time and within four time windows after the first time, to obtain the second node.

16. The non-transitory computer readable storage medium according to claim 13, wherein the analyzing alarm content of the third node comprises:
analyzing the alarm content of the third node to determine whether the alarm content comprises any one of a node publishing change, a node machine packet loss, a program crash at a node, a machine crash at a node, or a private line congestion at a node; and
if the alarm content comprises any one, determining that the alarm content is a root alarm; and
if the alarm content does not comprise any one, determining that the alarm content is not a root alarm.

17. The non-transitory computer readable storage medium according to claim 13, wherein the searching in the plurality of first links comprises:
searching, in the plurality of first links of the first link set, for one or more prior nodes located before the first node, to obtain one or more candidate nodes; and
searching, in the one or more candidate nodes, for one or more alarm generating nodes that generate alarm information within a first number of time windows before the first time and within a second number of time windows after the first time, to obtain the second node, the first number being greater than the second number.

\* \* \* \* \*